US010883492B2

(12) United States Patent
Misuno et al.

(10) Patent No.: US 10,883,492 B2
(45) Date of Patent: Jan. 5, 2021

(54) PLUNGER PUMP AND BRAKING DEVICE

(71) Applicant: HITACHI AUTOMOTIVE SYSTEMS, LTD., Hitachinaka (JP)

(72) Inventors: Masaki Misuno, Atsugi (JP); Chiharu Nakazawa, Kawasaki (JP); Atsuki Oohira, Utsunomiya (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 26 days.

(21) Appl. No.: 16/333,182

(22) PCT Filed: Sep. 4, 2017

(86) PCT No.: PCT/JP2017/031695
§ 371 (c)(1),
(2) Date: Mar. 13, 2019

(87) PCT Pub. No.: WO2018/056027
PCT Pub. Date: Mar. 29, 2018

(65) Prior Publication Data
US 2019/0242376 A1  Aug. 8, 2019

(30) Foreign Application Priority Data

Sep. 23, 2016  (JP) ................................. 2016-185014

(51) Int. Cl.
*B60T 8/40* (2006.01)
*F04B 53/10* (2006.01)
(Continued)

(52) U.S. Cl.
CPC .......... *F04B 53/1002* (2013.01); *B60T 8/368* (2013.01); *B60T 8/4031* (2013.01);
(Continued)

(58) Field of Classification Search
CPC ...... B60T 8/368; B60T 8/4031; B60T 8/4081; B60T 13/16; B60T 13/161; B60T 17/00;
(Continued)

(56) References Cited

U.S. PATENT DOCUMENTS 3,682,572 A    8/1972  Yarger
5,211,611 A *  5/1993  Lammers ................. F04B 9/04
                                                    475/178
5,540,570 A *  7/1996  Schuller ............... B60T 8/4031
                                                    417/545
5,562,430 A * 10/1996  Schuller ............... B60T 8/4031
                                                    417/545
(Continued)

FOREIGN PATENT DOCUMENTS

JP    2002-242850 A    8/2002
JP    2002-542430 A   12/2002
JP    2010-059903 A    3/2010

*Primary Examiner* — Thomas W Irvin
(74) *Attorney, Agent, or Firm* — Foley & Lardner LLP

(57) ABSTRACT

Provided is a plunger pump where quietness can be ensured. A plunger pump includes a cylinder, a piston, a discharge valve, and a plug member. The plug member includes: a recessed portion formed on a circumferential wall of a discharge chamber opposing an outer periphery of the discharge valve in a radial direction; and a discharge passage disposed at a position different from the recessed portion, formed on the circumferential wall of the discharge chamber opposing the outer periphery of the discharge valve in the radial direction, and connecting the discharge chamber and the outside with each other.

14 Claims, 10 Drawing Sheets

(51) Int. Cl.
*B60T 13/16* (2006.01)
*F04B 1/053* (2020.01)
*B60T 17/00* (2006.01)
*F04B 53/16* (2006.01)
*F04B 1/0452* (2020.01)
*B60T 8/36* (2006.01)

(52) U.S. Cl.
CPC .............. *B60T 13/16* (2013.01); *B60T 17/00* (2013.01); *F04B 1/0452* (2013.01); *F04B 1/053* (2013.01); *F04B 53/16* (2013.01); *B60T 8/4081* (2013.01); *B60T 13/161* (2013.01)

(58) Field of Classification Search
CPC .... F04B 53/1002; F04B 1/0452; F04B 1/053; F04B 53/16
See application file for complete search history.

(56) References Cited

U.S. PATENT DOCUMENTS

| | | | |
|---|---|---|---|
| 6,276,909 B1* | 8/2001 | Siegel | B60T 8/4031 417/470 |
| 6,340,295 B1* | 1/2002 | Hauser | B60T 8/4031 417/470 |
| 6,514,055 B1 | 2/2003 | Schuller | |
| 9,827,967 B2* | 11/2017 | Schuller | B60T 17/02 |
| 10,730,496 B2* | 8/2020 | Schumann | F04B 19/22 |
| 2002/0110460 A1 | 8/2002 | Kominami | |
| 2014/0202325 A1* | 7/2014 | Kramer | F01B 31/06 91/491 |
| 2015/0217745 A1* | 8/2015 | Schuller | F04B 53/02 92/169.1 |

* cited by examiner

PLUNGER PUMP AND BRAKING DEVICE

TECHNICAL FIELD

The present invention relates to a plunger pump and a braking device equipped with the plunger pump.

BACKGROUND ART

Conventionally, various braking devices have been provided. As one of the braking devices, a braking device disclosed in PTL 1 described below is known, for example. A schematic description of PTL 1 is that a plunger pump of a braking device has a suction chamber and a discharge chamber with a discharge valve interposed therebetween in an axial direction, and a discharge passage connected to the outside is formed on the discharge valve side of the discharge chamber in the axial direction so as to extend in the direction orthogonal to the axial direction.

CITATION LIST

Patent Literature

PTL 1: Japanese Patent Laid-Open No. 2010-59903

SUMMARY OF INVENTION

Technical Problem

However, in the technique disclosed in PTL 1, air bubbles easily stagnate in the discharge chamber so that there is a possibility that quietness cannot be sufficiently acquired.

It is an object of the present invention to provide a plunger pump and a braking device Where quietness can be ensured.

Solution to Problem

In one embodiment of the present invention, a plunger pump includes a cylinder, a piston, a discharge valve, and a plug member. The plug member includes a recessed portion formed on a circumferential wall of the discharge chamber opposing an outer periphery of the discharge valve in a radial direction, and a discharge passage connecting the discharge chamber and the outside with each other, disposed at a position different from the recessed portion, and formed on the circumferential wall of the discharge chamber opposing the outer periphery of the discharge valve in the radial direction.

Accordingly, quietness of a plunger pump can be improved.

DESCRIPTION OF EMBODIMENTS

Embodiment 1

Figure 1:
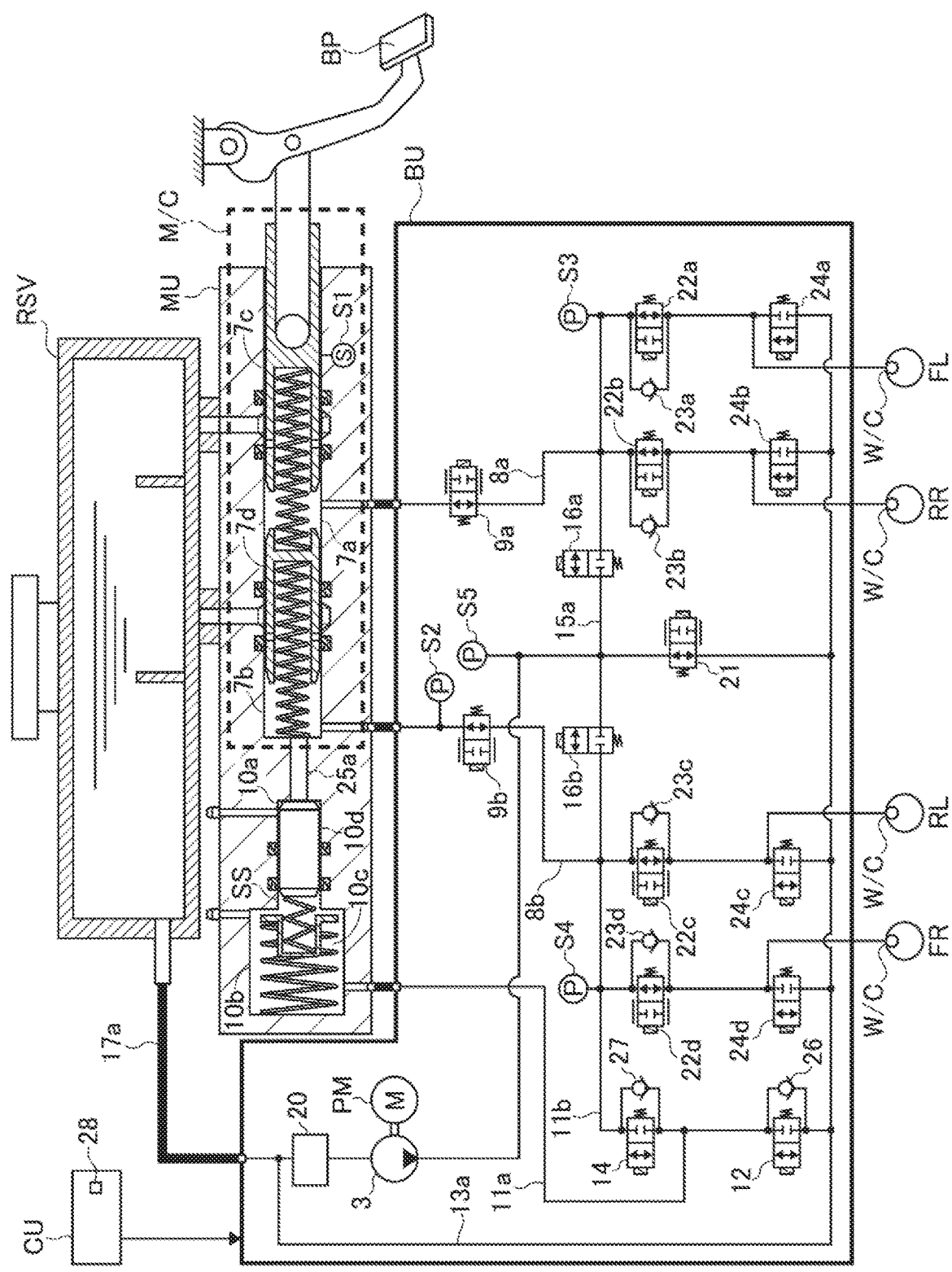
FIG. 1 is a view showing a braking device of an embodiment 1.

FIG. 1 is a view showing a braking device of an embodiment 1. The braking device of the embodiment 1 includes a brake pedal BP, a master cylinder unit MU, a valve unit BU, a reservoir tank RSV, and a control unit CU. The master cylinder unit MU and the valve unit BU are separate members. Assembling both units to each other using bolts forms a plurality of oil passages $8a$, $8b$, $11a$. Configurations are not limited to those where housings of both units are directly connected with each other, Both units may be connected with each other via steel pipes or the like.

The master cylinder unit MU includes a stroke sensor 1 which detects the amount of brake operation (the stroke of the brake pedal BP) performed by a driver. The master cylinder unit MU includes a master cylinder M/C and a stroke simulator SS. The master cylinder M/C has a primary fluid chamber $7a$ and a secondary fluid chamber $7b$, and brake fluid is supplied to the respective chambers from the reservoir tank RSV. When the brake pedal BP is pressed, brake fluid is output to a primary system from the primary fluid chamber $7a$ through a primary piston $7c$. At the same time, brake fluid is output to a secondary system from the secondary fluid chamber $7b$ through a secondary piston $7d$. The primary fluid chamber $7a$ is connected to a wheel cylinder W/C for a left front wheel FL and to a wheel cylinder W/C for a right rear wheel RR through the oil passage $8a$. The secondary fluid chamber $7b$ is connected to a wheel cylinder W/C for a left rear wheel RL and to a wheel cylinder W/C for a right front wheel FR through the oil passage $8b$.

A primary system pressure sensor S3, which detects a pressure in the primary system, is provided to the oil passage $8a$. A secondary system pressure sensor S4, which detects a pressure in the secondary system, is provided to the oil passage $8b$. A primary cut-off valve $9a$ is provided to the oil passage $8a$, and the primary cut-off valve $9a$ shuts off the connection between the primary fluid chamber $7a$ and the wheel cylinders W/C. A secondary cut-off valve $9b$ is provided to the oil passage $8b$, and the secondary cut-off valve $9b$ shuts off the connection between the secondary fluid chamber $7b$ and the wheel cylinders W/C. Each of the primary cut-off valve $9a$ and the secondary cut-off valve $9b$ is formed of a normally open solenoid valve.

A space is parted between a positive pressure chamber 10a and a back pressure chamber 10b of the stroke simulator SS in a fluid-tight manner so that brake fluid is prevented from moving between the positive pressure chamber 10a and the back pressure chamber 10b. The positive pressure chamber 10a is connected to an oil passage 25a. The oil passage 25a is connected to the secondary fluid chamber 7b. A master pressure sensor S2, which detects a master pressure, is provided to the oil passage 8b at a position upstream of the secondary cut-off valve 9b. The stroke simulator SS includes a spring 10c in the back pressure chamber 10b, and causes the brake pedal BP to generate an operation reaction force corresponding to the stroke of a piston 10d. The back pressure chamber 10b is connected to an oil passage 13a through the oil passage 11a, and is connected to the oil passage 8h through the oil passage 11a and an oil passage 11b. A stroke simulator out valve (stroke simulator regulating valve) 12 is provided to the oil passage 11a. A stroke simulator in valve 14 is provided to the oil passage 11b.

Each of the stroke simulator out valve 12 and the stroke simulator in valve 14 is formed of a normally closed solenoid valve. A check valve 26 is provided in parallel with the stroke simulator out valve 12. The check valve 26 allows brake fluid to flow into the oil passage 11a when the pressure in the oil passage 11a is lower than the pressure in the oil passage 13a. A check valve 27 is provided in parallel with the stroke simulator in valve 14. The check valve 27 allows brake fluid to flow into an oil passage 15a when the pressure in the oil passage 15a is lower than the pressure in the oil passage 11a. A primary communication valve 16a is provided between the oil passage 8a and the oil passage 15a, and the primary communication valve 16a can switch between establishing and shutting off of the communication between the primary system and a pump discharge system. Further, a secondary communication valve 16b is provided between the oil passage 8b and the oil passage 15a, and the secondary communication valve 16b can switch between establishing and shutting off of the communication between the secondary system and the pump discharge system. Each of the primary communication valve 16a and the secondary communication valve 16b is formed of a normally closed solenoid valve. A pump pressure sensor S5, which detects a pump discharge pressure, is provided to the oil passage 15a.

The valve unit BU includes a pump motor PM formed of a brush motor. The pump motor PM drives a plunger pump 3 so as to discharge brake fluid, sucked from the reservoir tank RSV through an oil passage 17a, to the oil passage 15a. In the housing of the valve unit BU, a fluid reservoir 20 is provided on the suction side of the plunger pump 3. Accordingly, also in the case of a failure where brake fluid leaks from the oil passage 17a, causing the fluid reservoir 20 to function as a brake fluid supply source (to the plunger pump 3) or as a drainage destination (from the wheel cylinders W/C) continues to control a hydraulic pressure in a wheel cylinder to be increased or decreased.

A pressure regulating valve 21 is provided between the oil passage 15a and the oil passage 13a and hence, surplus brake fluid discharged from the plunger pump 3 can be returned to the reservoir tank RSV through the oil passage 13a. Although the pressure regulating valve 21 is formed of a normally open solenoid valve, the pressure regulating valve 21 may be formed of a normally closed solenoid valve.

A left front wheel booster valve 22a is provided between the oil passage 8a and the wheel cylinder W/C (FL). The left front wheel booster valve 22a adjusts brake fluid which flows from the oil passage 8a to the wheel cylinder W/C (FL). A cheek valve 23a is provided in parallel with the left front wheel booster valve 22a. The check valve 23a allows brake fluid to flow into the oil passage 8a when the pressure in the oil passage 8a is lower than the pressure in the wheel cylinder W/C (FL). A left front wheel pressure reducing valve 24a is provided between the wheel cylinder W/C (FL) and the oil passage 13a. The left front wheel pressure reducing valve 24a reduces the pressure in the wheel cylinder W/C (FL).

A right rear wheel booster valve 22b is provided between the oil passage 8a and the Wheel cylinder W/C (RR). The right rear wheel booster valve 22b adjusts brake fluid which flows from the oil passage 8a to the wheel cylinder W/C (RR). A check valve 23b is provided in parallel with the right rear wheel booster valve 22b. The check valve 23b allows brake fluid to flow into the oil passage 8a when the pressure in the oil passage 8a is lower than the pressure in the wheel cylinder W/C (RR). A right rear wheel pressure reducing valve 24b is provided between the wheel cylinder W/C (RR) and the oil passage 13a. The right rear wheel pressure reducing valve 24b reduces the pressure in the wheel cylinder W/C (RR).

A left rear wheel booster valve 22c is provided between the oil passage Sb and the wheel cylinder W/C (RL). The left rear wheel booster valve 22c adjusts brake fluid which flows from the oil passage 8b to the wheel cylinder W/C (RL). A check valve 23c is provided in parallel with the left rear wheel booster valve 22c. The check valve 23c allows brake fluid to flow into the oil passage 8b when the pressure in the oil passage 8b is lower than the pressure in the wheel cylinder W/C (RL). A left rear wheel pressure reducing valve 24c is provided between the wheel cylinder W/C (RL) and the oil passage 13a. The left rear wheel pressure reducing valve 24c reduces the pressure in the wheel cylinder W/C (RL).

A right front wheel booster valve 22d is provided between the oil passage Sb and the wheel cylinder W/C (FR). The right front wheel booster valve 22d adjusts brake fluid which flows from the oil passage 8b to the wheel cylinder W/C (FR). A cheek valve 23d is provided in parallel with the right front wheel booster valve 22d. The check valve 23d allows brake fluid to flow into the oil passage 8b when the pressure in the oil passage 8b is lower than the pressure in the wheel cylinder W/C (FR). A right front wheel pressure reducing valve 24d is provided between the wheel cylinder W/C (FR) and the oil passage 13a. The right front wheel pressure reducing valve 24d reduces the pressure in the wheel cylinder W/C (FR).

Each of the booster valves 22a, 22b, 22c, 22d is formed of a normally open solenoid valve. Each of the pressure reducing valves 24a, 24b, 24c, 24d is formed of a normally closed solenoid valve.

During normal braking where braking force corresponding to the amount of brake operation performed by a driver is generated in each wheel, the control unit CU controls the primary cut-off valve 9a and the secondary cut-off valve 9b in a valve closing direction, controls the stroke simulator in valve 14 in a valve closing direction, controls the stroke simulator out valve 12 in a valve opening direction, controls the primary communication valve 16a and the secondary communication valve 16b in a valve opening direction, and controls the pressure regulating valve 21 in a valve closing direction. At the same time, the control unit CU causes the pump motor PM to operate. With such operations, desired brake fluid can be fed to the respective wheel cylinders W/C from the reservoir tank RSV through the oil passage 17a, the plunger pump 3, the oil passage 15a, and the oil passage 8a or the oil passage 8b in this order. At this point of operation, the motor rotation of the pump motor PM, and a feed back of detected values of the primary system pressure sensor S3, the secondary system pressure sensor S4, and the pump pressure sensor S5 for controlling the pressure regulating valve 21 so as to acquire a target pressure provide a desired braking force. Further, brake fluid which is fed from the primary fluid chamber 7a of the master cylinder M/C is introduced into the positive pressure chamber 10a of the stroke simulator SS. With the movement of the piston 10d, a reaction force acts on the spring 10c so that a reaction force corresponding to a brake pedal operation is generated. Accordingly, an appropriate braking force, and a reaction force and a stroke of the brake pedal BP can be generated at the time of performing braking operation.

In the embodiment 1, during a failure where leakage or the like of brake fluid from a pipe of the master cylinder M/C causes a stroke of the brake pedal BP to excessively increase with respect to a master pressure as compared to normal conditions, boost control of the wheel cylinders W/C, which is performed by the pump motor PM, is continued in accordance with the amount of brake operation performed by a driver. In the same manner as the target hydraulic pressure under normal conditions, the target hydraulic pressure of each wheel cylinder W/C is calculated from respective detected values of the stroke sensor 1 and the master pressure sensor S2. Accordingly, provided that the stroke S of the brake pedal BP or a master pressure Pmc is output, no influence is applied to the target hydraulic pressure. Therefore, boost control of the wheel cylinder W/C can be performed in the same manner in normal conditions without affecting a pressure in the wheel cylinder W/C.

Figure 2:
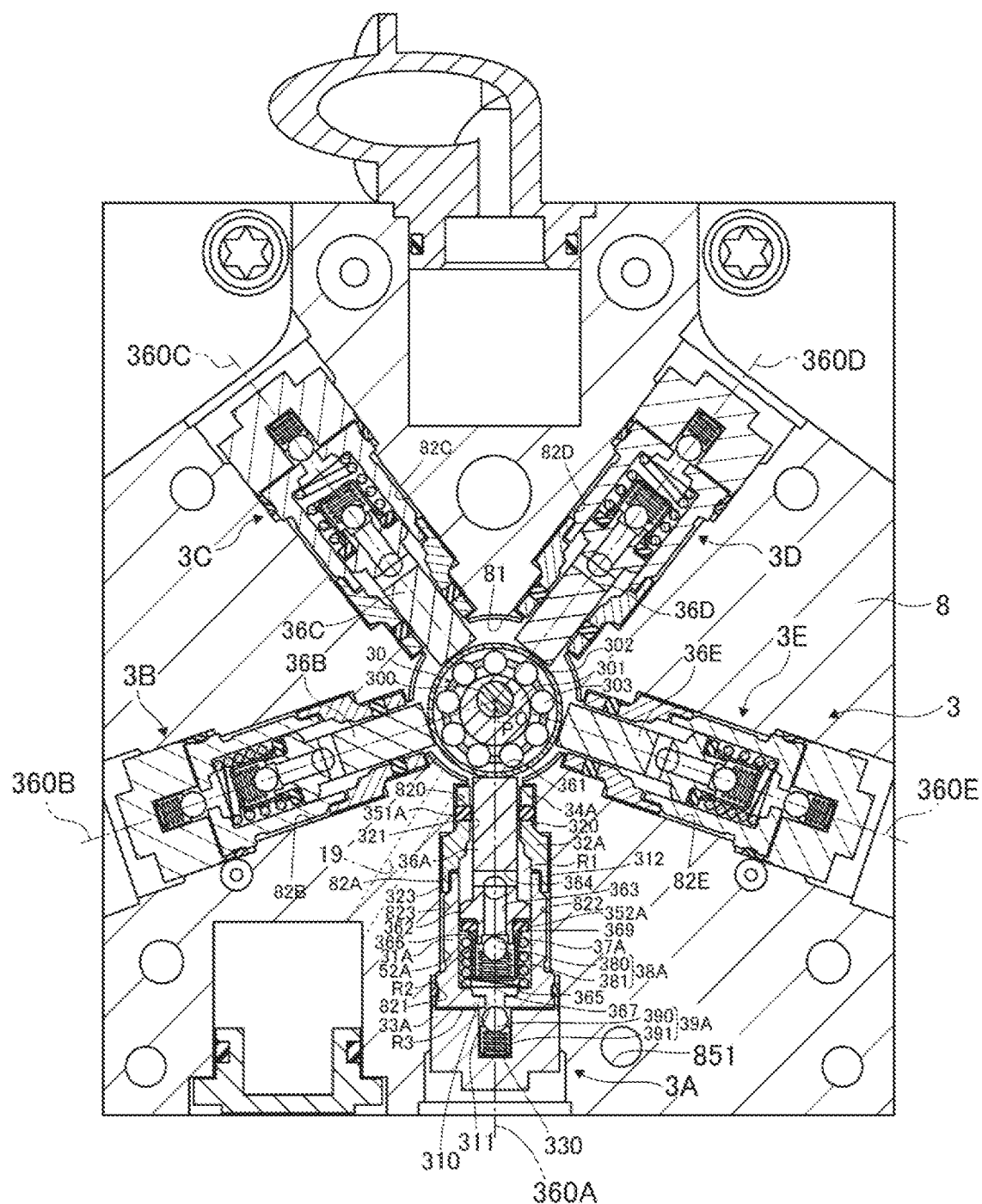
FIG. 2 is a cross-sectional view of a plunger pump of the embodiment 1.
Figure 3:
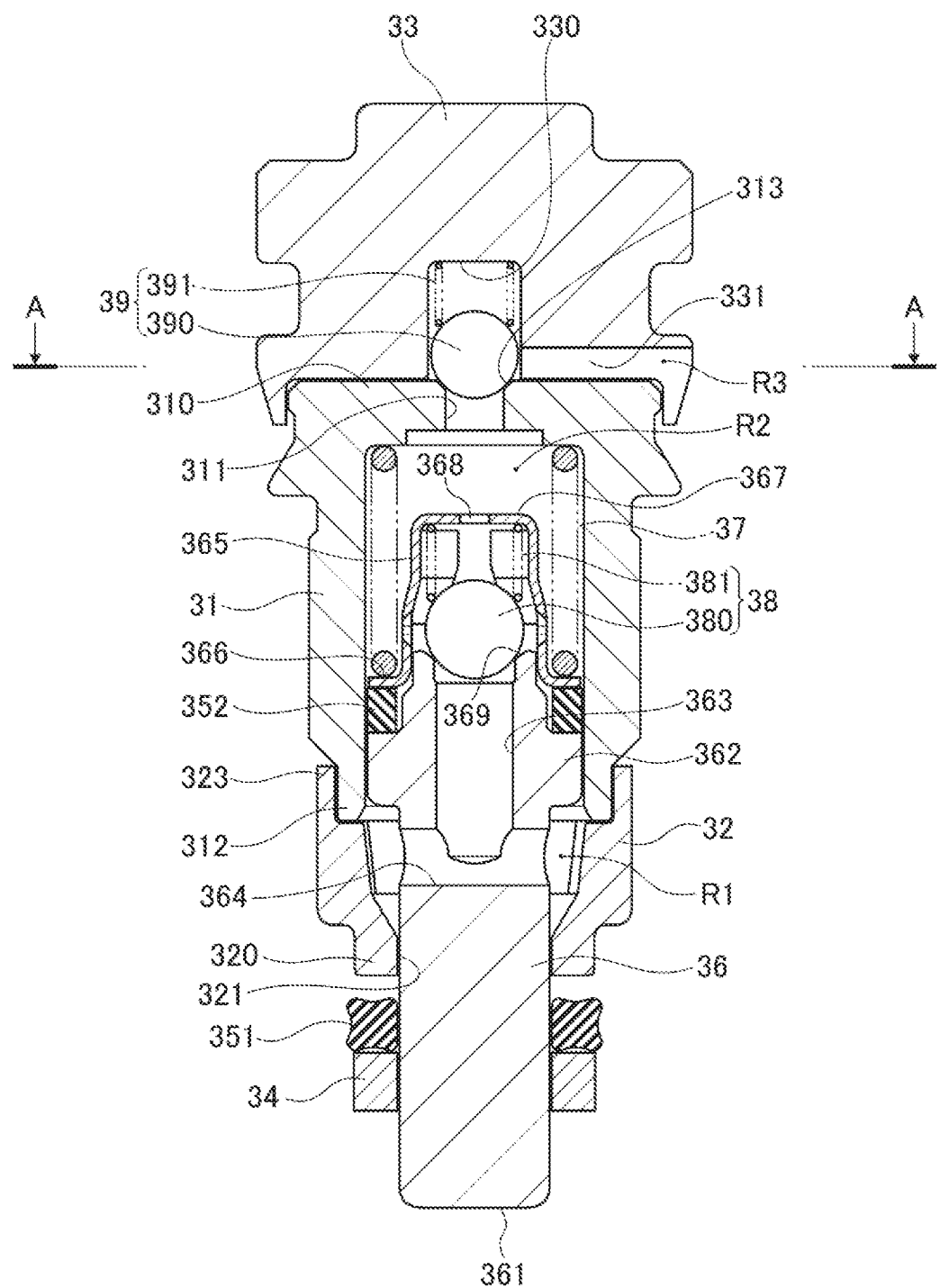
FIG. 3 is an enlarged cross-sectional view of a pump portion in the embodiment 1.

FIG. 2 is a cross-sectional view of the plunger pump of the embodiment 1, and FIG. 3 is an enlarged cross-sectional view of a pump portion in the embodiment 1. The axial center (axis) of the rotary shaft of the pump motor PM is approximately aligned with the axial center O of a cam accommodation hole 81. A rotary drive shaft 300 and a cam unit 30 are accommodated in the cam accommodation hole 81. The rotary drive shaft 300 is a rotary shaft and a drive shaft of the plunger pump 3. The rotary drive shaft 300 is a drive shaft of the plunger pump 3. The rotary drive shaft 300 is coupled and fixed to the rotary shaft of the pump motor PM such that the axial center of the rotary drive shaft 300 extends on the extension of the axial center of the rotary shaft of the pump motor PM. Accordingly, the rotary drive shaft 300 is rotationally driven by the pump motor PM. The axial center of the rotary drive shaft 300 is approximately aligned with the axial center O. The rotary drive shaft 300 rotates integrally with the rotary shaft of the pump motor PM around the axial center O. The cam unit 30 is provided to the rotary drive shaft 300. The cam unit 30 includes a cam 301, a drive member 302, and a plurality of rolling elements 303. The cam 301 is an eccentric cam having a columnar shape, and has an axial center P which is eccentric to the axial center O of the rotary drive shaft 300. The axial center P extends approximately parallel to the axial center O, The cam 301 oscillates while rotating about the axial center O integrally with the rotary drive shaft 300. The drive member 302 has a cylindrical shape, and is disposed on the outer peripheral side of the cam 301. The axial center of the drive member 302 is approximately aligned with the axial center P. The drive member 302 is rotatable with respect to the cam 301 about the axial center P. The drive member 302 is an eccentric bearing having the configuration similar to that of the outer race of a rolling bearing. The plurality of rolling elements 303 are disposed between the outer peripheral surface of the cam 301 and the inner peripheral surface of the drive member 302. Each rolling element 303 is a needle roller, and extends along the direction of the axial center of the rotary drive shaft 300.

The plunger pump 3 is a radial plunger pump of a fixed cylinder type. The plunger pump 3 includes a housing 8, the rotary drive shaft 300, the cam portion 30, and a plurality of (five) pump portions 3A to 3E. Each of the pump portions 3A to 3E is a plunger pump (piston pump) acting as a reciprocating pump, and is operated with the rotation of the rotary drive shaft 300. The pump portion sucks and discharges brake fluid as working liquid with the reciprocating motion of plungers (pistons) 36. The cam unit 30 has a function of converting the rotational motion of the rotary drive shaft 300 into the reciprocating motion of the plunger 36. In the case where the configurations of the respective pump portions 3A to 3E are distinguished from each other, indexes A to E are respectively added to reference numerals. The respective plungers 36 are disposed around the cam unit 30, and are respectively accommodated in cylinder accommodation holes 82. An axial center 360 of each plunger 36 is approximately aligned with the axial center of each cylinder accommodation hole 82, and extends in the radial direction of the rotary drive shaft 300. In other words, five (the number of the cylinder accommodation holes 82) plungers 36 are provided, and extend in the radial direction from the axial center O. The plungers 36A to 36E are arranged at approximately uniform intervals in the circumferential direction of the rotary drive shaft 300 (hereinafter simply referred to as circumferential direction). That is, the plungers 36A to 36E are approximately equidistantly arranged in the rotational direction of the rotary drive shaft 300. The axes 360A to 360E of these plungers 36A to 36F are disposed on the same plane α. These plungers 36A to 36E are driven by the same rotary drive shaft 300 and the same earn unit 30.

The pump portion 3A includes a cylinder sleeve 31, a filter member 32, a plug 33, a guide ring 34, a first seal ring 351, a second seal ring 352, the plunger 36, a return spring 37, a suction valve 38, and a discharge valve 39. These members are disposed in the cylinder accommodation hole 82. The cylinder sleeve 31 has a bottomed cylindrical shape, and a through hole 311 penetrates a bottom portion 310. The cylinder sleeve 31 is fixed in the cylinder accommodation hole 82. The axial center of the cylinder sleeve 31 is approximately aligned with the axial center 360 of the cylinder accommodation hole 82. An end portion 312 of the cylinder sleeve 31 on the opening side is disposed at an intermediate diameter portion 822 (suction port 823), and the bottom portion 310 is disposed at a large diameter portion (discharge port) 821. The filter member 32 has a bottomed cylindrical shape. A hole 321 penetrates a bottom portion 320, and a plurality of opening portions are formed on a side wall portion of the filter member 32 in a penetrating manner. Filters are installed on these opening portions. An end portion 323 of the filter member 32 on the opening side is fixed to the end portion 312 of the cylinder sleeve 31 on the opening side. The bottom portion 320 is disposed at a small diameter portion 820. The axial center of the filter member 32 is approximately aligned with the axial center 360 of the cylinder accommodation hole 82. A gap is formed between the outer peripheral surface of the filter member 32 on which the opening portions are formed and the inner peripheral surface of the cylinder accommodation hole 82 (suction port 823). A first fluid communication passage communicates with the suction port 823 and the above-mentioned gap. The plug 33 has a columnar shape, and has a discharge chamber 330 having a bottomed cylindrical shape and a discharge passage 331 on one end side in the direction of the axial center of the plug 33. The discharge passage 331 extends in the radial direction so as to connect the discharge chamber 330 and the outer peripheral surface of the plug 33 with each other, and the discharge passage 331 communicates with the discharge port 821. The above-mentioned one end side of the plug 33 in the axial direction is fixed to the bottom portion 310 of the cylinder sleeve 31. The axial center of the plug 33 is approximately aligned with the axial center 360 of the cylinder accommodation hole 82. The plug 33 is fixed to the large diameter portion 821, and closes the opening of the cylinder accommodation hole 82 on the outer peripheral surface of the housing 8. A second fluid communication passage communicates with the discharge port 821 and the above-mentioned discharge passage 331 of the plug 33. The guide ring 34 has a cylindrical shape, and is fixed to a portion (the small diameter portion 820) of the cylinder accommodation hole 82 at a position closer to the cam accommodation hole 81 than the filter member 32. The axial center of the guide ring 34 is approximately aligned with the axial center 360 of the cylinder accommodation hole 82. The first seal ring 351 is disposed in the cylinder accommodation hole 82 (the small diameter portion 820) at a position between the guide ring 34 and the filter member 32.

The plunger 36 has a columnar shape. The plunger 36 has an end surface (hereinafter referred to as "plunger end surface") 361 on one side in the direction of the axial center of the plunger 36, and includes a flange portion 362 on the outer periphery of the plunger 36 at a position on the other side in the direction of the axial center. The plunger end surface 361 has a planar shape which expands in the direction approximately orthogonal to the axial center 360 of the plunger 36. The plunger end surface 361 has an approximately circular shape about the axial center 360. The plunger 36 has an axial hole 363 and a radial hole 364 on the inside thereof. The axial hole 363 extends on the axial center 360, and is open on the end surface of the plunger 36 on the above-mentioned other side in the direction of the axial center. The radial hole 364 extends in the radial direction of the plunger 36. The radial hole 364 is open on the outer peripheral surface of the plunger 36 at a position on the above-mentioned one side in the direction of the axial center with respect to the flange portion 362. The radial hole 364 is connected to the above-mentioned one side of the axial hole 363 in the direction of the axial center. A check valve casing 365 is fixed to the end portion of the plunger 36 on the above-mentioned other side in the direction of the axial center. The check valve casing 365 is formed of a thin plate, and has a bottomed cylindrical shape. The check valve casing 365 includes a flange portion 366 on the outer periphery at the end portion of the cheek valve casing 365 on the opening side. A plurality of holes 368 are formed in the side wall portion and a bottom portion 367 in a penetrating manner. The end portion of the check valve easing 365 on the opening side is fitted on the end portion of the plunger 36 on the above-mentioned other side in the direction of the axial center. The second seal ring 352 is disposed between the flange portion 366 of the check valve casing 365 and the flange portion 362 of the plunger 36. The above-mentioned other side of the plunger 36 in the direction of the axial center is inserted to the inner peripheral side of the cylinder sleeve 31 so that the flange portion 362 is guided and supported by the cylinder sleeve 31. A portion of the plunger 36 disposed on the above-mentioned one side in the direction of the axial center with respect to the radial hole 364 is inserted in the inner peripheral side (the hole 321) of the bottom portion 320 of the filter member 32, in the inner peripheral side of the first seal ring 351, and in inner peripheral side of the guide ring 34. With such insertion, the plunger 36 is guided and supported. The axial center 360 of the plunger 36 is approximately aligned with the axial center of the cylinder sleeve 31 or the like (the cylinder accommodation hole 82). The end portion of the plunger 36 on the above-mentioned one side in the direction of the axial center (the plunger end surface 361) protrudes into the cam accommodation hole 81.

The return spring 37 is a compression coil spring, and is installed on the inner peripheral side of the cylinder sleeve 31. One end of the return spring 37 is installed at the bottom portion 310 of the cylinder sleeve 31, and the other end of the return spring 37 is installed at the flange portion 366 of the check valve casing 365. The return spring 37 always biases the plunger 36 toward the cam accommodation hole 81 with respect to the cylinder sleeve 31 (the cylinder accommodation hole 82). The suction valve 38 includes a ball 380 as a valve element and a return spring 381, and these members are accommodated in the inner peripheral side of the check valve casing 365. A valve seat 369 is formed on the end surface of the plunger 36 on the above-mentioned other side in the direction of the axial center at a position around the opening of the axial hole 363. When the ball 380 is seated on the valve seat 369, the axial hole 363 is closed. The return spring 381 is a compression coil spring. One end of the return spring 381 is installed at the bottom portion 367 of the check valve casing 365, and the other end of the return spring 381 is installed on the ball 380.

The return spring 381 always biases the ball 380 toward the valve seat 369 with respect to the check valve casing 365 (the plunger 36). The discharge valve 39 includes a ball 390 as a valve element and a return spring 391, and these members are accommodated in the discharge chamber 330 of the plug 33. A valve seat 313 is formed on the bottom portion 310 of the cylinder sleeve 31 at a position around the opening portion of the through hole 311. When the ball 390 is seated on the valve seat 313, the through hole 311 is closed. The return spring 391 is a compression coil spring. One end of the return spring 391 is installed on the bottom surface of the discharge chamber 330, and the other end of the return spring 391 is installed on the ball 390. The return spring 391 always biases the ball 390 toward the valve seat 313.

In the cylinder accommodation hole 82, a space R1 disposed at a position closer to the cam accommodation hole 81 than the flange portion 362 of the plunger 36 forms a suction-side space which communicates with the first fluid communication passage. To be more specific, the space extends from the above-mentioned gap, formed between the outer peripheral surface of the filter member 32 and the inner peripheral surface of the cylinder accommodation hole 82 (the suction port 823), to the radial hole 364 and the axial hole 363 of the plunger 36 through the plurality of openings formed in the filter member 32, and the gap, formed between the outer peripheral surface of the plunger 36 and the inner peripheral surface of the filter member 32. This space functions as the suction-side space R1. Communication between this suction-side space R1 and the cam accommodation hole 81 is suppressed by the first seal ring 351.

In the cylinder accommodation hole 82, a space R3 formed between the cylinder sleeve 31 and the plug 33 forms a discharge-side space which communicates with the second fluid communication passage. To be more specific, the space extends from the discharge passage 331 of the plug 33 to the discharge port 821, and this space functions as the discharge-side space R3. On the inner peripheral side of the cylinder sleeve 31, the space R2 is formed between the flange portion 362 of the plunger 36 and the bottom portion 310 of the cylinder sleeve 31. The volume of the space R2 varies with the reciprocation movement (stroke) of the plunger 36 with respect to the cylinder sleeve 31. Opening the suction valve 38 allows the space R2 to communicate with the suction-side space R1. Opening the discharge valve 39 allows the space R2 to communicate with the discharge-side space R3.

The plunger 36 of the pump portion 3A performs a reciprocating motion so as to perform a pumping action. That is, when the plunger 36 performs a stroke in a direction toward the cam accommodation hole 81 (the axial center O), the volume of the space R2 increases so that a pressure in the space R2 reduces. When the discharge valve 39 is closed and the suction valve 38 is opened, brake fluid as working liquid flows from the suction-side space R1 into the space R2, and brake fluid is supplied from the first fluid communication passage to the space R2 through the suction port 823. When the plunger 36 performs a stroke in a direction away from the cam accommodation hole 81, the volume of the space R2 reduces so that a pressure in the space R2 increases. When the suction valve 38 is closed and the discharge valve 39 is opened, brake fluid flows from the space R2 to the discharge-side space R3 through the through hole 311 so that the brake fluid is supplied to the second fluid communication passage through the discharge port 821. Other pump portions 3B to 3E have similar configuration. Brake fluid which the respective pump portions 3A to 3E discharge to the second fluid communication passage is collected to one fluid discharge passage 13, and is shared in hydraulic circuits of two systems.

Figure 4:
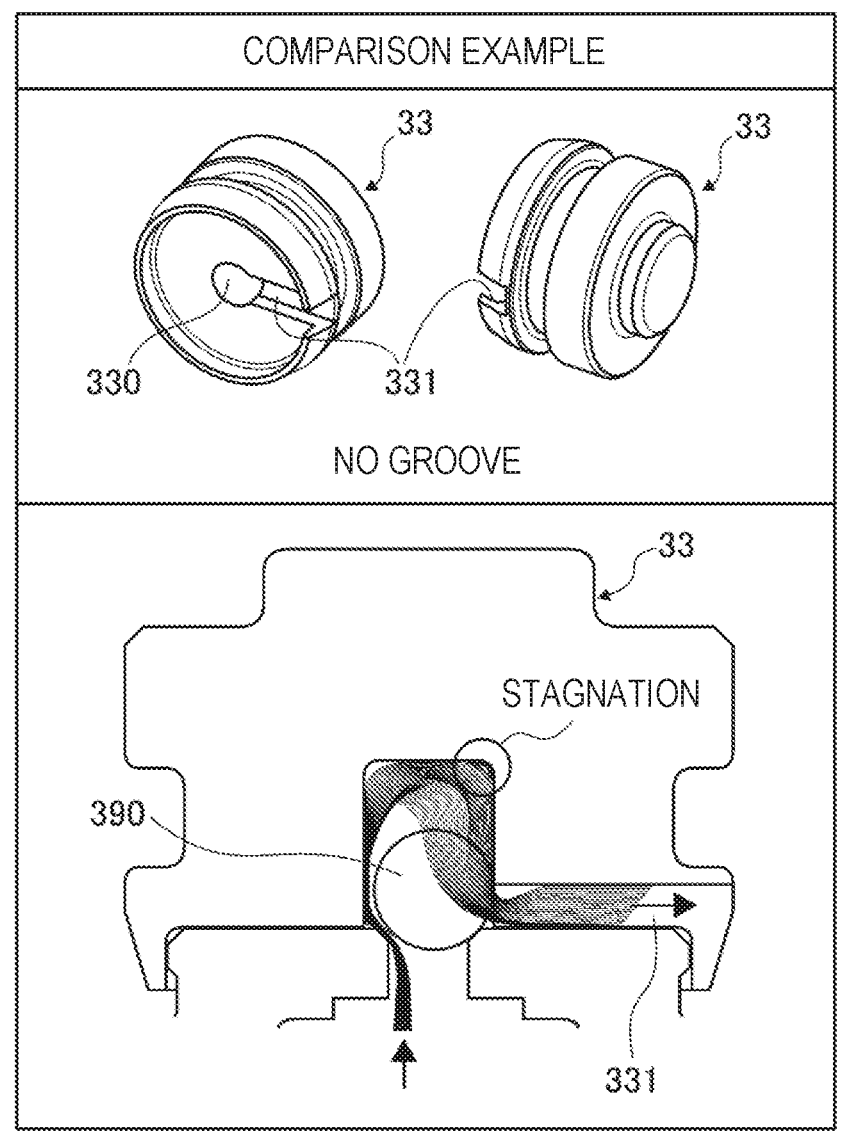
FIG. 4 is a view showing the results of the simulation of the flow of a fluid in a discharge chamber as a comparison example.

Next, problems of a plunger pump PP are described. Abnormal noise may be generated when the plunger pump PP is operated. Inventors have made intensive studies and, as a result, have found that the generation of abnormal noise is caused by stagnation of air bubbles in the discharge chamber 330 of the plug 33. FIG. 4 is a view showing the results of the simulation of the flow of a fluid in the discharge chamber 330 of the plug 33 as a comparison example. Assume the case where the ball 390 is lifted from the valve seat 313 when brake fluid flows from the space R2 into the discharge-side space R3 through the through hole 311. In such a case, the brake fluid flows through a gap formed between the ball 390 and the discharge chamber 330. It can be understood that the brake fluid flows into a space in the discharge chamber 330 on the back surface side of the ball 390 as viewed from the through hole 311 side (hereinafter referred to as "back surface space") and, thereafter, the brake fluid flows into the discharge passage 331.

Figure 5:
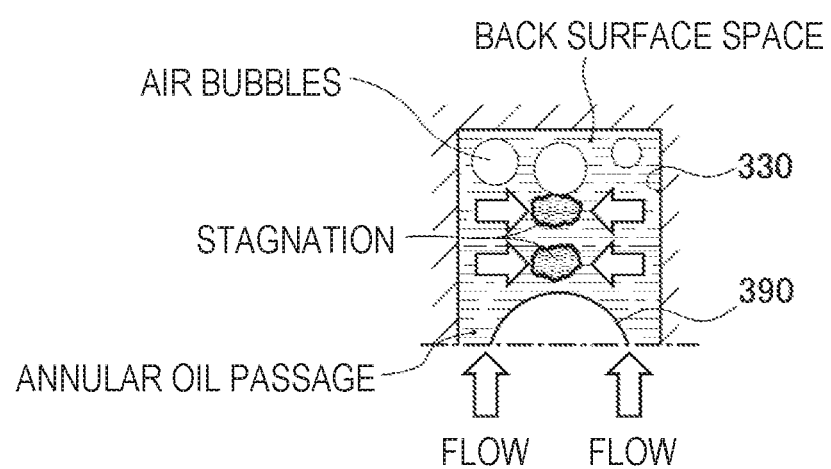
FIG. 5 is a schematic view showing a state in the discharge chamber in the comparison example.

In this embodiment, as shown in FIG. 4, it can be understood that a region where the flow of fluid stagnates is formed at the corner portion of the back surface space. FIG. 5 is a schematic view showing a state in the discharge chamber in the comparison example. If brake fluid flows into the discharge chamber 330 in a state where air bubbles are mixed into the brake fluid, such air bubbles may stagnate in a stagnation region. In that case, there is a problem that a damping term around the ball 390 is reduced, thus allowing the ball 390 to easily vibrate. In the case Where a uniform gap is formed between the ball 390 and the circumferential wall of the discharge chamber 330, brake fluid flows into the discharge chamber 330 from the whole periphery of the ball 390. Accordingly, brake fluid flowing into the discharge chamber 330 is balanced so that the flow easily stagnates. In addition to the above, due to an increase in the number of cylinders of the plunger pump PP, the plug 33 is disposed at a position upward of the axial center of the cam accommodation hole 81 in the gravity direction and hence, there is a problem that air bubbles cannot easily escape from the discharge chamber 330 of the plug 33.

Figure 6:
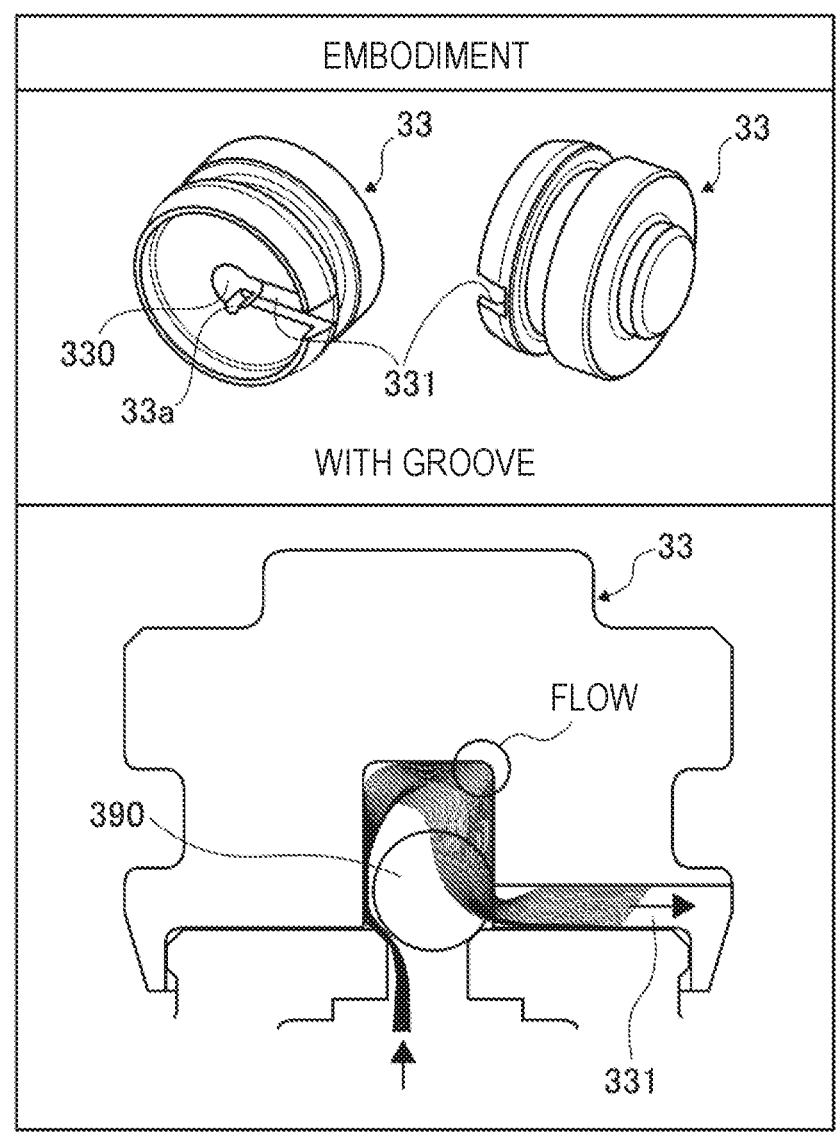
FIG. 6 is a view showing the results of the simulation of the flow of a fluid in a discharge chamber as the embodiment 1.
Figure 7:
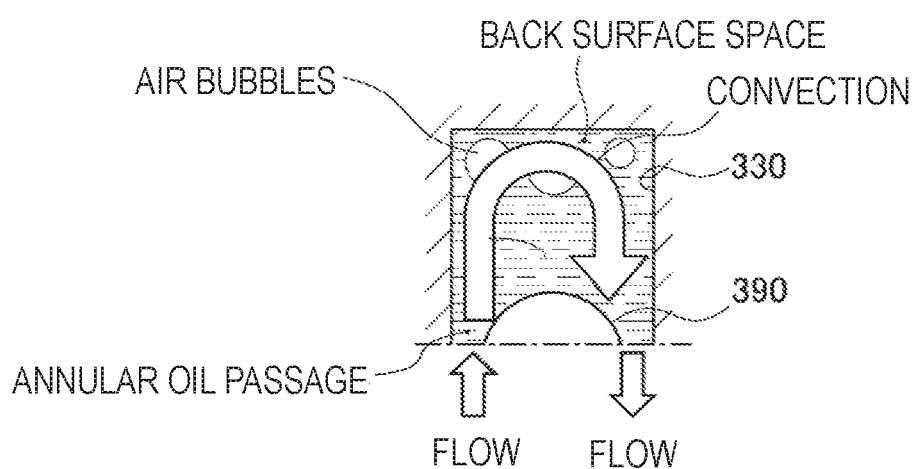
FIG. 7 is a schematic view showing a state in the discharge chamber in the embodiment 1.

In view of the above, in the embodiment, a recessed portion 33a having an arc shape in cross section is formed on the circumferential wall of the discharge chamber 330 so as to generate the flow in the discharge chamber 330. FIG. 6 is a view showing the results of the simulation of the flow of a fluid in the discharge chamber of the plug as the embodiment 1. In the embodiment 1, the recessed portion 33a, which extends in the direction of the reciprocating motion of the plunger 36, is formed on the circumferential wall of the discharge chamber 330 at a position which is approximately orthogonal to the extending direction of the discharge passage 331. In this case, it can be understood that the flow is generated at the corner portion of a back surface space in the embodiment 1, that is, the flow is generated in the region where stagnation is generated in the comparison example, and hence, stagnation is eliminated. FIG. 7 is a schematic view showing a state in the discharge chamber in the embodiment 1. When brake fluid flows into the discharge chamber 330 in a state where air bubbles are mixed into the brake fluid, the brake fluid flows into the discharge chamber 330 from the whole periphery of the ball 390. However, due to the formation of the recessed portion 33a, the brake fluid flows in a non-uniform manner over the whole periphery of the ball 390 and hence, convection is generated in the back surface space. Accordingly, there is no possibility of air bubbles stagnating in the back surface space so that a reduction in the damping term around the ball 390 can be suppressed, thus suppressing abnormal noise.

Figure 8:
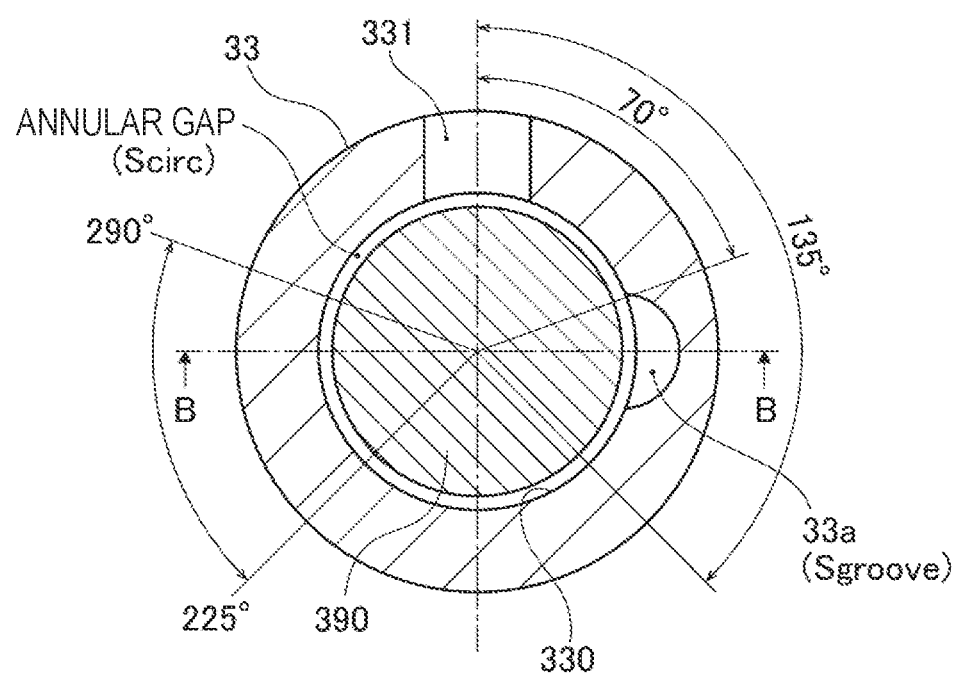
FIG. 8 is a schematic view showing a cross section taken along line A-A in FIG. 3.
Figure 9:
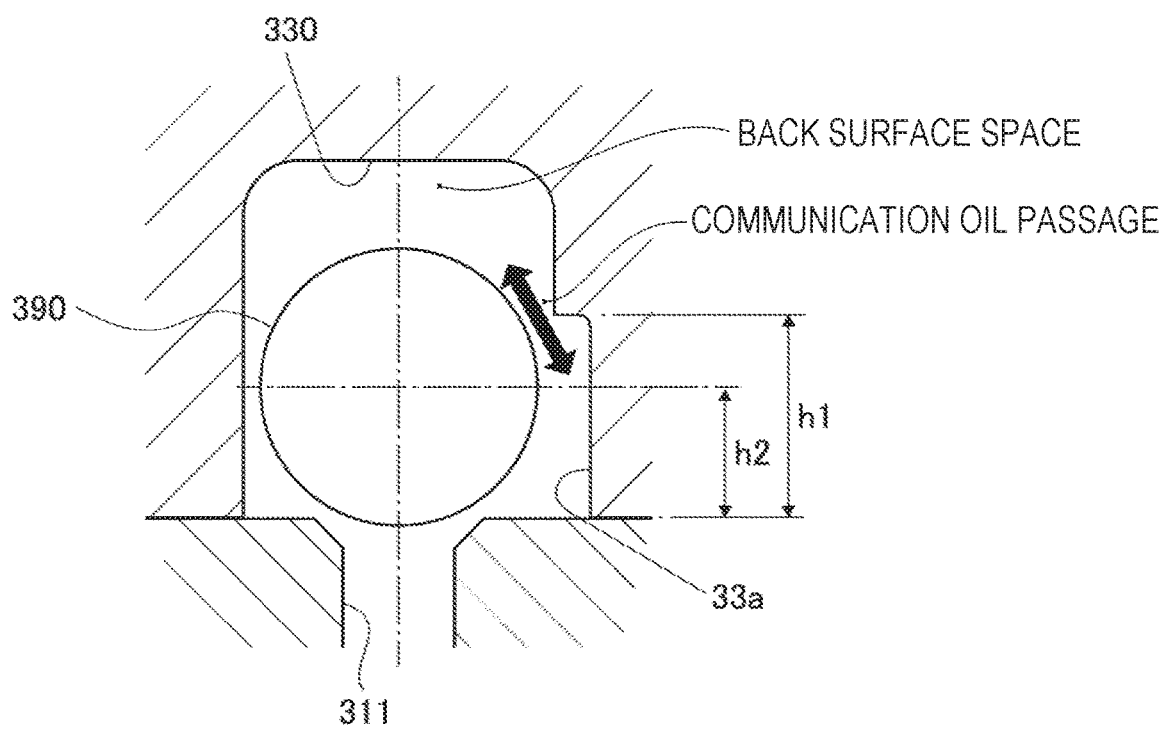
FIG. 9 is a schematic view showing a cross section taken along line B-B in FIG. 8.
Figure 10:
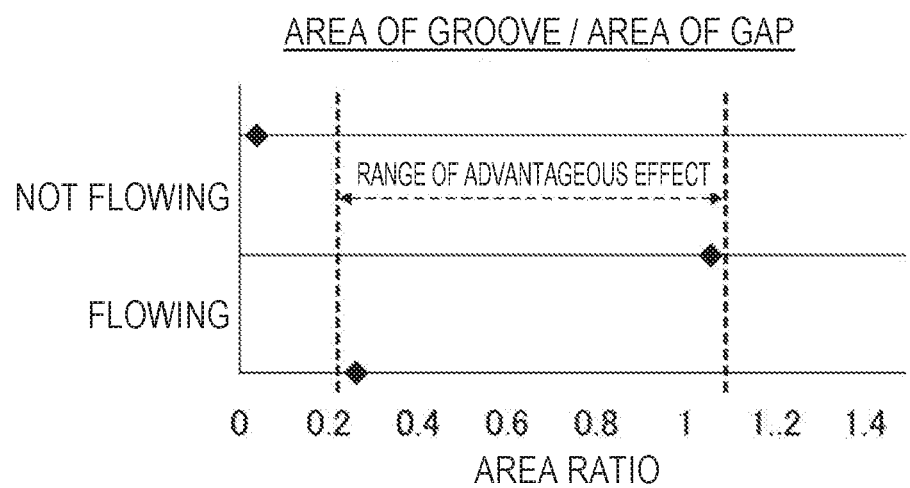
FIG. 10 is a graph of characteristics showing the results of the experiment on the relationship between an area ratio and a flow in the embodiment 1.

FIG. 8 is a schematic view showing a cross section taken along line A-A in FIG. 3, and FIG. 9 is a schematic view showing a cross section taken along line B-B in FIG. 8. Polar coordinates are set using the axial center of the plug 33 as the singularity, and an axis parallel to the discharge passage 331 is used as the reference. The cross-sectional area of an annular gap formed between the outer periphery of the ball 390 and the circumferential wall of the discharge chamber 330 is defined as "Scirc". The cross-sectional area of the recessed portion 33a is defined as "Sgroove". An angle formed between the axis parallel to the discharge passage 331 and a line which passes through approximately the center of the recessed portion 33a in the circumferential direction is defined as "θ". The depth of the recessed portion 33a in the direction of the movement axis of the piston is defined as "h1". The inventors have made studies of the optimal area ratio using a ratio Rs of Sgroove to Scirc (=Sgroove/Scirc) with the angle θ fixed to 90 degrees. FIG. 10 is a graph of characteristics showing the results of the experiment on the relationship between an area ratio and a flow. As the result of the experiment, it is found that a flow is generated when the ratio Rs falls within a range from 0.265 to 1.058.

Figure 11:
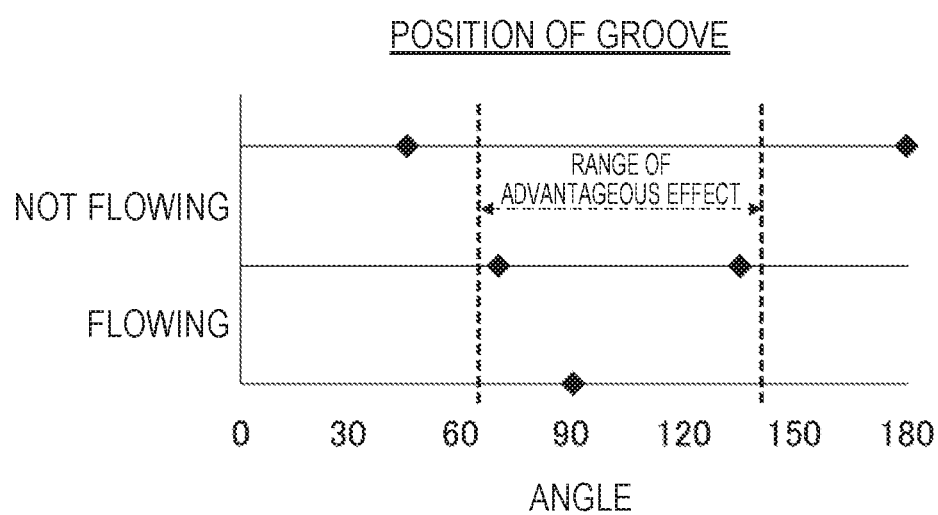
FIG. 11 is a graph of characteristics showing the results of the experiment on the relationship between an angle θ, formed between a discharge passage and a recessed portion, and a flow in the embodiment 1.

Next, the inventors have made studies of the optimal angle θ with the ratio Rs fixed to a predetermined value satisfying the above-mentioned range. FIG. 11 is a graph of characteristics showing the results of the experiment on the relationship between an angle θ, formed between the discharge passage and the recessed portion, and a flow. As the result of the experiment, it is found that a flow is effectively generated when the angle θ falls within a range from 70 degrees to 135 degrees (or 225 degrees to 290 degrees). That is, it is considered as follows. When the distance between the discharge passage 331 and the recessed portion 33a is excessively small, brake fluid which flows through the recessed portion 33a is discharged through the discharge passage 331 before the brake fluid flows into the back surface space. Accordingly, a flow which promotes stirring is not easily generated in the back surface space. Further, in the case where the recessed portion 33a is formed at a position symmetrical to the discharge passage 331 with respect to the ball 390, branching or merging occurs on the path of a flow. When branching or merging occurs with a symmetrical shape, the direction of the flow suddenly bends. Accordingly, large energy loss occurs due to friction in fluid so that it is considered that stagnation is easily generated in the flow.

Next, the depth h1 of the recessed portion 33a in the direction of the movement axis of the plunger is studied. In this embodiment, the depth h1 is a value which uses the end surface of the plug 33 on the cylinder sleeve 31 side as a base point, and which increases more as the distance from the cylinder sleeve 31 increases along the direction of the movement axis of the plunger. Accordingly, the length of the recessed portion 33a along the direction of the movement axis of the plunger increases with larger depth h1. As shown in FIG. 9, it is desirable to form the recessed portion 33a such that, in a state where the ball 390 is open, the recessed portion 33a has the depth h1 which is equal to or larger than the half of the ball 390 in the direction of the movement axis of the plunger. In other words, in a state where the ball 390 is open, it is preferable that the center of the ball 390 be at a position lower than the position of the depth h1 of the recessed portion 33a in the direction of the movement axis of the plunger. With such a configuration, also in the case where the ball 390 is at a high position in the direction of the movement axis of the plunger by the opening of the valve, the cross section of the recessed portion 33a is present at the maximum-diameter depth position h2 where the ball 390 has the maximum diameter as viewed in the direction of the movement axis of the plunger. Accordingly, it is possible to ensure a communication oil passage which makes the through hole 311 and the back surface space communicate with each other through the recessed portion 33a and hence, a flow can be effectively generated in the back surface space. Assume the case where the ball 390 moves upward in the direction of the movement axis of the plunger by the opening of the valve, and the depth h1 of the recessed portion 33a is smaller than the height of the maximum-diameter depth position h2, which is the position where the ball 390 approaches most the circumferential wall of the discharge chamber 330. In such a case, the flow in the recessed portion 33a is suppressed between the ball 390 and the circumferential wall of the discharge chamber 330, so that it becomes difficult to effectively generate a flow in the back surface space.

It is desirable that the depth of the opening, which faces the discharge chamber 330, of the discharge passage 331 in the direction of the movement axis of the piston be equal to or smaller than half of the depth of the ball 390 in the direction of the movement axis of the plunger in a state where the ball 390 is closed. In other words, it is preferable that the center of the ball 390 in a state where the ball 390 is closed be at a position higher than the depth position of the opening of the discharge passage 331. Assume the case where the depth of the opening of the discharge passage 331 is set equal to or larger than half of the depth of the ball 390 in the direction of the movement axis of the plunger. In such a case, most of the brake fluid flows into the discharge passage 331 before convection is generated in the back surface space so that stagnation is generated in the back surface space instead.

As has been described heretofore, according to the embodiment 1, the manner of operation and advantageous effects enumerated below can be acquired.

(1) The plunger pump PP includes: the cylinder sleeve 31 (cylinder); the plunger 36 (piston) accommodated in the cylinder sleeve 31 in a movable manner; the discharge valve 39 disposed on a side opposite to the plunger 36 in the direction of the movement axis of the plunger 36, and defining a compression chamber in cooperation with the plunger 36 and the inner periphery of the cylinder sleeve 31; and the plug 33 (plug member) defining the discharge chamber 330 in cooperation with the discharge valve 39 in a direction of the movement axis of the plunger 36. The plug 33 includes: the recessed portion 33a which is formed on the circumferential wall of the discharge chamber 330 opposing the outer periphery of the discharge valve 39 in the radial direction; and the discharge passage 331 disposed at a position different from the recessed portion 33a, formed on the circumferential wall of the discharge chamber 330 opposing the outer periphery of the discharge valve 39 in the radial direction, and connecting the discharge chamber 330 and the outside with each other. Accordingly, the plunger pump PP can acquire quietness.

(2) The recessed portion 33a is formed such that, in the direction of the movement axis of the plunger, the height of the recessed portion 33a ranges from the cylinder sleeve 31 side to a position reaching or overreaching half of the ball 390 (discharge valve). Accordingly, quietness can be effectively improved.

(3) The discharge passage 331 is formed in a range, in the direction of the movement axis of the plunger, from the cylinder sleeve 31 side to a position which does not overreach the half of the ball 390. Accordingly, quietness can be effectively improved.

(4) The recessed portion 33a is formed in a range, which excludes a position opposing the discharge passage 331 in the circumferential direction of the ball 390. Accordingly, quietness can be effectively improved.

(5) The recessed portion 33a is formed in a range of angles from 70° to 135° (225° to 290°) with respect to the discharge passage 331 in the circumferential direction of the ball 390. Accordingly, quietness can be effectively improved.

(6) The discharge valve 39 is a ball valve. Accordingly, quietness can be effectively improved.

(7) Assuming a cross-sectional area between the circumferential wall of the discharge chamber 330 and the diameter of the ball 390 in a direction perpendicular to the movement axis of the plunger as "Scirc", and a cross-sectional area of the recessed portion 33a as "Sgroove", $0.265 \leq Sgroove/Scirc \leq 1.058$ is satisfied. Accordingly, quietness can be effectively improved.

(8) The recessed portion 33a has an arc shape in a direction perpendicular to the movement axis of the plunger. Accordingly, quietness can be effectively improved.

(9) The braking device includes: the housing 8 having the fluid passage and the cylinder accommodation hole 82 (bore) therein; and the plunger pump PP disposed in the housing 8. The plunger pump PP includes: the cylinder sleeve 31 accommodated in the cylinder accommodation hole 82; the plunger 36 accommodated in the cylinder sleeve 31 in a movable manner; the discharge valve 39 disposed on a side opposite to the plunger 36 in the direction of the movement axis of the plunger, and defining the compression chamber in cooperation with the plunger 36 and the inner periphery of the cylinder sleeve 31, the discharge valve 39; and the plug 33 defining the discharge chamber 330 in cooperation with the discharge valve 39 in the direction of the movement axis of the plunger. The plug 33 includes: the recessed portion 33a which is formed on the circumferential wall of the discharge chamber 330 opposing the outer periphery of the discharge valve 39 in the radial direction; and the discharge passage 331 disposed at a position different from the recessed portion 33a, formed on the circumferential wall of the discharge chamber 330 opposing the outer periphery of the discharge valve 39 in the radial direction, and connecting the discharge chamber 330 and the fluid passage with each other, the discharge passage 331 being. Accordingly, it is possible to provide the braking device where quietness is effectively improved.

(10) The braking device includes: the drive member 302 (eccentric bearing) coming into contact with one end surface of the plunger 36 in the axial direction to cause the plunger 36 to operate with rotation; the rotary drive shaft 300 having the outer periphery on which the drive member 302 is provided; and the pump motor PM which is an electric motor configured to rotate the rotary drive shaft 300. The plurality of plunger pumps PP are provided to the outer periphery of the drive member 302. Accordingly, it is possible to provide the braking device where quietness is effectively improved.

Another Embodiment

Figure 12:
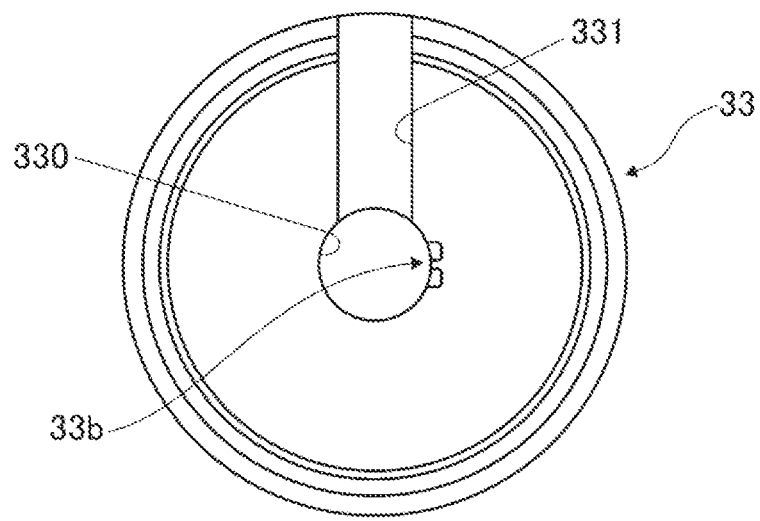
FIG. 12 is a bottom view of a plug in another embodiment.
Figure 13:
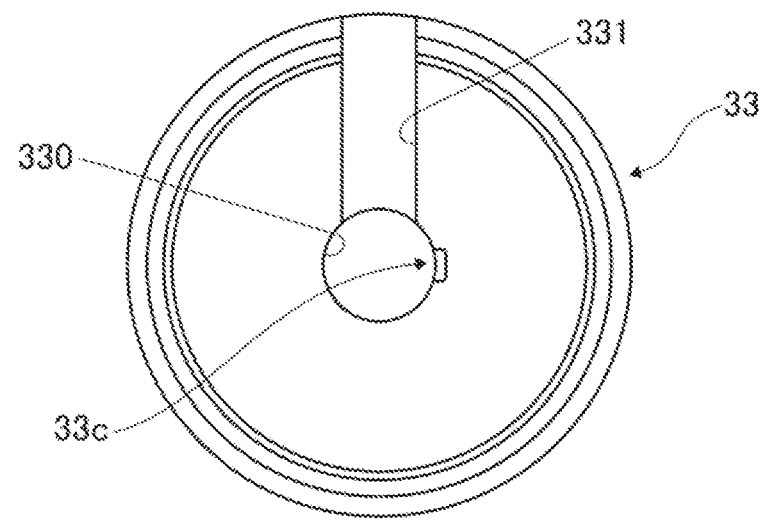
FIG. 13 is a bottom view of a plug in another embodiment.

The description has been made with reference to the embodiment 1 heretofore. However, the present invention also includes other configurations. For example, in the embodiment 1, the recessed portion 33a has an arc shape in cross section. However, as shown in FIG. 12 which is a bottom view of the plug, the recessed portion 33a may be formed to have a slit shape in cross section. Alternatively, as shown FIG. 13 which is a bottom view of the plug, the recessed portion 33a may be formed to have a generally rectangular shape in cross section.

Other aspects which may be understood based on the above-mentioned embodiment are described hereinafter.

A plunger pump includes: a cylinder; a piston accommodated in the cylinder in a movable manner; a discharge valve disposed on a side opposite to the piston in a direction of a movement axis of the piston, and defining a compression chamber in cooperation with the piston and an inner periphery of the cylinder; and a plug member defining a discharge chamber in cooperation with the discharge valve in the direction of the movement axis of the piston. The plug member includes: a recessed portion which is formed on a circumferential wall of the discharge chamber opposing an outer periphery of the discharge valve in a radial direction; and a discharge passage disposed at a position different from the recessed portion, formed on the circumferential wall of the discharge chamber opposing the outer periphery of the discharge valve in the radial direction, and connecting the discharge chamber and an outside with each other. In a more preferred aspect, in the above-mentioned aspect, the recessed portion is formed in a range, in the direction of the movement axis of the piston, from the cylinder side to a position reaching or overreaching half of the discharge valve. In still another preferred aspect, in any one of the above-mentioned aspects, the discharge passage is formed in a range, in the direction of the movement axis of the piston, from the cylinder side to a position which does not overreach the half of the discharge valve. In still another preferred aspect, in any one of the above-mentioned aspects, the recessed portion is formed in a range, in a circumferential direction of the discharge valve, Which excludes a position opposing the discharge passage. In still another preferred aspect, in any one of the above-mentioned aspects, the recessed portion is formed in a range, in the circumferential direction of the discharge valve, of angles from 70° to 135° with respect to a direction in which the discharge passage extends. In still another preferred aspect, in any one of the above-mentioned aspects, the discharge valve is a ball valve. In still another preferred aspect, in any one of the above-mentioned aspects, when a cross-sectional area between the circumferential wall of the discharge chamber and a diameter of the ball valve in a direction perpendicular to the movement axis of the piston is "Scirc", and a cross-sectional area of the recessed portion in the direction perpendicular to the movement axis of the piston is "Sgroove", 0.265≤Sgroove/Scirc≤1.058 is satisfied. In still another preferred aspect, in any one of the above-mentioned aspects, the recessed portion has an arc shape in a direction perpendicular to the movement axis of the piston.

Further, from another view point, a braking device includes: a housing having a fluid passage and a bore therein; and a plunger pump disposed in the housing. The plunger pump includes: a cylinder accommodated in the bore; a piston accommodated in the cylinder in a movable manner; a discharge valve disposed on a side opposite to the piston in a direction of a movement axis of the piston, and defining a compression chamber in cooperation with the piston and an inner periphery of the cylinder, the discharge valve; and a plug member defining a discharge chamber in cooperation with the discharge valve in the direction of the movement axis of the piston. The plug member includes: a recessed portion formed on a circumferential wall of the discharge chamber opposing an outer periphery of the discharge valve in a radial direction; and a discharge passage disposed at a position different from the recessed portion, formed on the circumferential wall of the discharge chamber opposing the outer periphery of the discharge valve in the radial direction, and connecting the discharge chamber and the fluid passage with each other, the discharge passage. In the above-mentioned aspect, preferably, the recessed portion is formed in a range, in the direction of the movement axis of the piston, from the cylinder side to a position reaching or overreaching half of the discharge valve. In still another preferred aspect, in any one of the above-mentioned aspects, the discharge passage is formed in a range, in the direction of the movement axis of the piston, from the cylinder side to a position which does not overreach half of the discharge valve. In still another preferred aspect, in any one of the above-mentioned aspects, the recessed portion is formed in a range, in a circumferential direction of the discharge valve, which excludes a position opposing the discharge passage. In still another preferred aspect, in any one of the above-mentioned aspects, the recessed portion is formed in a range, in the circumferential direction of the discharge valve, of angles from 70° to 135° with respect to a direction in which the discharge passage extends. In still another preferred aspect, in any one of the above-mentioned aspects, the braking device includes: an eccentric bearing coming into contact with one end surface of the piston in an axial direction to cause the piston to operate with rotation; a rotary drive shaft having an outer periphery on which the eccentric bearing is provided; and an electric motor configured to rotate the rotary drive shaft. The plunger pump includes a plurality of the plunger pumps provided at an Outer periphery of the eccentric bearing.

Some embodiments of the present invention have been described heretofore. However, the above-mentioned embodiments of the present invention are provided for facilitating the understanding of the present invention, and do not limit the present invention. Modifications and variations are conceivable without departing from the gist of the present invention and, the present invention includes a technique equivalent to the present invention. Within a range where at least a portion of the above-mentioned problem can be solved or a range where at least a portion of the above-mentioned advantageous effects can be acquired, respective constitutional elements described in the claims and the specification may be arbitrarily combined or omitted.

This application claims priority to Japanese patent application No. 2016-185014 filed on Sep. 23, 2016. The entire disclosure including the specification, the claims, the drawings, and the abstract of Japanese patent application No. 2016-185014 filed on Sep. 23, 2016 is incorporated herein by reference.

REFERENCE SIGNS LIST

M/C master cylinder, PM pump motor (actuator), RSV reservoir tank, SS stroke simulator, W/C wheel cylinder, 31 cylinder sleeve, 33 plug (plug member), 33a recessed portion, 36 plunger (piston), 39 discharge valve, 330 discharge chamber, 331 discharge passage, 390 ball (ball valve)

The invention claimed is:
1. A plunger pump comprising:
a cylinder;
a piston accommodated in the cylinder in a movable manner;
a discharge valve disposed on a side opposite to the piston in a direction of a movement axis of the piston, and defining a compression chamber in cooperation with the piston and an inner periphery of the cylinder; and
a plug member defining a discharge chamber in cooperation with the discharge valve in the direction of the movement axis of the piston, wherein
the plug member includes
a recessed portion formed on a circumferential wall of the discharge chamber opposing an outer periphery of the discharge valve in a radial direction, and
a discharge passage disposed at a position different from the recessed portion, formed on the circumferential wall of the discharge chamber opposing the outer periphery of the discharge valve in the radial direction, and connecting the discharge chamber and an outside with each other,
wherein the recessed portion is formed in a range, in the direction of the movement axis of the piston, from a cylinder side to a position reaching or overreaching half of the discharge valve, and
wherein the discharge passage is formed in a range, in the direction of the movement axis of the piston, from the cylinder side to a position which does not overreach the half of the discharge valve.
2. The plunger pump according to claim 1, wherein the recessed portion is formed in a range, in a circumferential direction of the discharge valve, which excludes a position opposing the discharge passage.
3. The plunger pump according to claim 2, wherein the recessed portion is formed in a range, in the circumferential direction of the discharge valve, of angles from 70° to 135° with respect to a direction in which the discharge passage extends.
4. The plunger pump according to claim 1, wherein the discharge valve is a ball valve.
5. The plunger pump according to claim 4, wherein when a cross-sectional area between the circumferential wall of the discharge chamber and a diameter of the ball valve in a direction perpendicular to the movement axis of the piston is "Scirc", and a cross-sectional area of the recessed portion in the direction perpendicular to the movement axis of the piston is "Sgroove",
0.265≤Sgroove/Scirc≤1.058 is satisfied.
6. The plunger pump according to claim 5, wherein the recessed portion is formed in a range, in a circumferential direction of the discharge valve, which excludes a position opposing the discharge passage.
7. The plunger pump according to claim 6, wherein the recessed portion is formed in a range, in the circumferential direction of the discharge valve, of angles from 70° to 135° with respect to a direction in which the discharge passage extends.
8. The plunger pump according to claim 1, wherein the recessed portion is formed in a range, in a circumferential direction of the discharge valve, which excludes a position opposing the discharge passage.
9. The plunger pump according to claim 8, wherein the recessed portion is formed in a range, in the circumferential direction of the discharge valve, of angles from 70° to 135° with respect to a direction in which the discharge passage extends.
10. The plunger pump according to claim 1, wherein the recessed portion has an arc shape in a direction perpendicular to the movement axis of the piston.
11. A braking device comprising:
a housing having a fluid passage and a bore therein; and
a plunger pump disposed in the housing, wherein
the plunger pump includes
a cylinder accommodated in the bore,
a piston accommodated in the cylinder in a movable manner,
a discharge valve disposed on a side opposite to the piston in a direction of a movement axis of the piston, and defining a compression chamber in cooperation with the piston and an inner periphery of the cylinder, and
a plug member defining a discharge chamber in cooperation with the discharge valve in the direction of the movement axis of the piston, and
the plug member includes
a recessed portion formed on a circumferential wall of the discharge chamber opposing an outer periphery of the discharge valve in a radial direction, and
a discharge passage disposed at a position different from the recessed portion, formed on the circumferential wall of the discharge chamber opposing the outer periphery of the discharge valve in the radial direction, and connecting the discharge chamber and the fluid passage with each other,
wherein the recessed portion is formed in a range, in the direction of the movement axis of the piston, from a cylinder side to a position reaching or overreaching half of the discharge valve, and
wherein the discharge passage is formed in a range, in the direction of the movement axis of the piston, from the cylinder side to a position which does not overreach the half of the discharge valve.
12. The braking device according to claim 11, wherein the recessed portion is formed in a range, in a circumferential direction of the discharge valve, which excludes a position opposing the discharge passage.

13. The braking device according to claim 12, wherein the recessed portion is formed in a range, in the circumferential direction of the discharge valve, of angles from 70° to 135° with respect to a direction in which the discharge passage extends.

14. The braking device according to claim 11, comprising:

an eccentric bearing disposed to come into contact with one end surface of the piston in an axial direction to cause the piston to operate with rotation;

a rotary drive shaft having an outer periphery on which the eccentric bearing is provided; and an electric motor configured to rotate the rotary drive shaft, wherein the plunger pump includes a plurality of the plunger pumps provided at an outer periphery of the eccentric bearing.

* * * * *